US006944661B2

(12) United States Patent
Moore et al.

(10) Patent No.: US 6,944,661 B2
(45) Date of Patent: Sep. 13, 2005

(54) INTERNET DOMAIN NAMES WITH REGIONAL ASSOCIATIONS

(75) Inventors: Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 09/778,203

(22) Filed: Feb. 6, 2001

(65) Prior Publication Data

US 2002/0107981 A1 Aug. 8, 2002

(51) Int. Cl.[7] .............................................. G06F 15/173
(52) U.S. Cl. ...................... 709/225; 709/220; 709/223; 709/229; 709/238
(58) Field of Search ............................. 709/220–226, 709/229, 238

(56) References Cited

U.S. PATENT DOCUMENTS

| 6,092,204 | A | * | 7/2000 | Baker ........................... 713/201 |
| 6,345,294 | B1 | * | 2/2002 | O'Toole et al. ............. 709/222 |
| 6,625,647 | B1 | * | 9/2003 | Barrick, Jr. et al. ........ 709/224 |
| 6,654,796 | B1 | * | 11/2003 | Slater et al. ................. 709/220 |
| 6,678,731 | B1 | * | 1/2004 | Howard et al. ............. 709/225 |
| 6,691,106 | B1 | * | 2/2004 | Sathyanarayan ............... 707/3 |
| 6,731,612 | B1 | * | 5/2004 | Koss ........................... 370/310 |

* cited by examiner

Primary Examiner—Jeffrey Gaffin
Assistant Examiner—Eron J. Sorrell
(74) Attorney, Agent, or Firm—Robert Lieber

(57) ABSTRACT

Disclosed is a system and method for providing redirection services, for public networks like the Internet, based upon requests containing both a functional term and a domain name uniquely associated with the address of an enterprise providing the service. An example would be an Internet request directed to "www.*.local.com", where "*" represents a functional term associated with one or more potential final destinations and "www.local.com" is the domain name of the web site providing the redirection service. In a preferred embodiment, where the functional term is associated with plural possible destinations, redirection is based upon proximity of the selected destination to the requester. Thus, a request to "www.emeraldhills.local.com", wherein "emeraldhills" is all or part of a business name used by several enterprises, is redirected to the enterprise closest to the request origin. The invention accommodates requests transmitted both by mobile and stationary requesters.

17 Claims, 3 Drawing Sheets

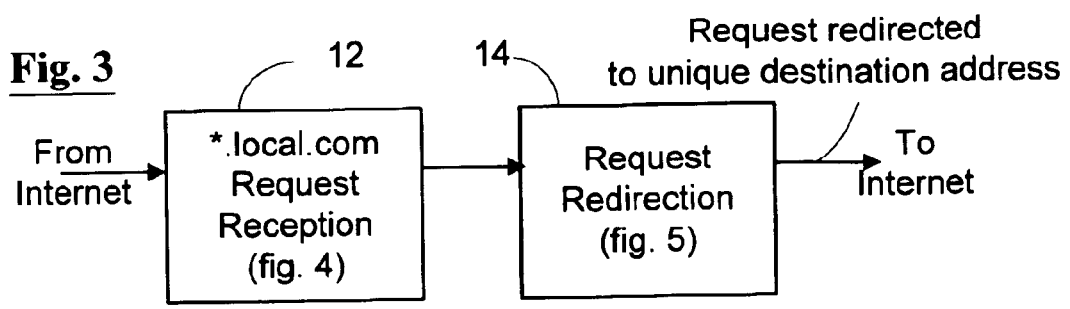
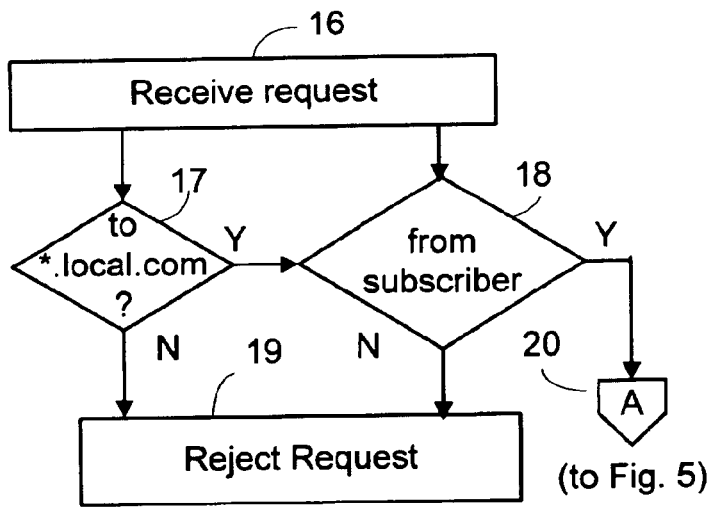

INTERNET DOMAIN NAMES WITH REGIONAL ASSOCIATIONS

BACKGROUND OF THE INVENTION

On today's Internet, domain names assigned to individual Internet sites are required to be unique. Such names are registered by name registration services responsible for assuring that a name proposed for one site is not in prior use by another site. Many of these services offer ancillary services; e.g. redirection services allowing communications to a destination/host site (a site subscribed to that service) to be addressed with a shortened name associated with the service.

For example, a contemporary service with the domain name "http://go.to/" allows a customer with a long domain name—e.g. "http://milleniumgoldrush.com"—to effectively employ a shorter name such as "go.to/goldrush.com", which cause such communications to be sent initially to the service and redirected by the service to the destination. However, shortened name terms used in such redirection processes also are required to be unique; i.e. "goldrush.com" could not be used if it is already registered to someone other than the owner of the destination site. Thus, selection of shortened names for such redirection usage is almost as difficult as registered names directly associated with destinations.

We believe that a need exists for allowing such shortened names to be assigned on a non-unique basis, provided that they can be applied in a unique and unambiguous manner.

SUMMARY OF THE INVENTION

This invention pertains to a domain name redirection system enabling its subscribers to have their communications directed to shortened names associated with redirection service sites—such shortened names permissibly non-unique and/or containing terms or phrases which theoretically could conflict with existing domain name registrations—wherein such communications are subject to being redirected to final destinations in a manner which does not conflict with or infringe upon usages of existing registered domain names.

One criterion for non-conflicting redirection, which we consider suitable, is regional association, wherein redirection is effected based on the regional location of the source of each communication. For example, in a redirection service system based on this criterion, the system providing the redirection service could have a server stationed at a site named for example "http://local.com". Communications intended for redirection by that service would be addressed to "http://local.com/h", where "h" is a shortened name having a non-unique association with an intended destination host site "H". Assume, for example, that several plumbing establishments do business in different regions under the "non-unique" name "Aardvark Plumbing", and one or more of them is subscribed to the service at "local.com". The subscribed enterprises could show in their business cards and advertisements, as one of their Internet sites, "http://local.com/aardvark". Inquiries directed to this site address would be redirected automatically to the appropriate business sites as follows.

The redirection server at "http://local.com" would maintain a list of subscribing enterprises by region, and associate with each subscribing site both a shortened name, which need not be uniquely associated, and an address uniquely associated with that site which need not be related to the shortened name. In this example, communications directed to "local.com/aardvark" could be redirected by the redirection server to a subscribed plumbing enterprise associated on a non-unique basis with the shortened term "aardvark". The criterion for such redirection would be designed to choose the subscribed site closest to the source of the communication. To do so, the redirection server would determine the location of the communication source (for example, by referring to a "cookie" implanted in the source's browser). If only one subscribing plumbing establishment is located in the inquirers locale, the inquiry would be redirected automatically to the (unique) site address used by that establishment. If more than one establishment with the term "aardvark" are in the inquirer's locale, the server would send a message to the inquirer, indicating the local establishments and their mailing addresses and telephone numbers and enabling the inquirer to select one of the indicated establishments. If a selection is made the inquiry is routed to the selected establishment. If a selection is not made within a reasonable time, an optional action by the redirection server would be to communicate further with the request originator offering the latter specific options for redirection.

It should be understood, in general, that a shortened term for such redirection could be a DBA (doing business as) name not registered to or otherwise uniquely owned by the subscriber using that term. Such a term also need not have any meaningful association to actual domain names and addresses uniquely registered to the respective subscriber.

We also contemplate, as an alternative service, that a server at local.com could be adapted to offer an optional service permitting its users to fill in a form for locating a business establishment meeting specific criteria. This form would ask for the type of business establishment the user is searching for, the user's locale (e.g. state and zip code) and the user's preference as to selection. Thus, one user could indicate that he/she is looking for a plumbing repair shop doing business in the user's locale as "Aardvark Plumbing", and another user could indicate an "aardvark plumbing" business providing mail order sales of plumbing tools and bath fixtures. Obviously, the latter type of business need not be local to the party completing the form, and in fact there may not be any local businesses in this category.

Features of this invention are:
 a) a redirection service for a public communication network such as the Internet, said service allowing for unambiguous use of unregistered domain names
 b) a redirection service, as just stated, wherein upon reception by the service host of a request directed to an unregistered domain name assigned to more than one potential destination location the service host is effective to select a single destination uniquely suited to the request and redirect the request to the selected destination
 c) a redirection service, as just stated, wherein the service host is capable of ascertaining the location of the originator of the request, and to select the single destination for redirection of the respective request on the basis of proximity of the selected destination to the request originator
 d) a redirection service as just stated wherein the single selected destination is a destination nearer to the request originator than any other destination potentially associated with the respective request
 e) a redirection service as in (b) above, wherein the selection of said single destination by said service host is based upon user profile information associated with the location of the request originator f) a redirection service as just stated wherein the user profile information is stored at the location of the request originator g) a redirection service as in (e) above wherein the user profile information is stored at the service host These and other features, aspects, benefits and potential advantages of this invention will be more fully understood from the following description.

BRIEF DESCRIPTION OF THE DRAWINGS

FIG. 3 is a block diagram illustrating on a broad level logical organization of a regional redirection server like that shown in FIG. 2

FIG. 4 is a flowchart characterizing logical processes performed by the redirection server of FIG. 3 for determining if the a request received by the server applies uniquely to a single destination, and for redirecting a request to such destination.

DETAILED DESCRIPTION

This invention pertains to a system and method for providing redirection services wherein Internet inquiries directed to short (and non-unique) business names are unambiguously redirected to registered and uniquely assigned Internet addresses.

Prior Art

In describing the prior art it is assumed that: (1) an Internet user in Hollywood, Fla., is seeking to contact a restaurant doing business as "Emerald Hills Diner" in the nearby city of Fort Lauderdale, Fla.; but (2) the "natural" Internet domain name "www. emeraldhills.com" is registered to a distant lawn care firm in New York state, and the actual domain name registered to the local diner is "www.emeraldhills-fl.com". Accordingly, referring to FIG. 1, if the user at 1 does not know the actual domain name of the local diner, and tries to apply the natural domain name, the user is directly connected to the web site 2 of the distant lawn care firm and not to the web site of the local diner. This connection is of course useless to this particular user; being the obvious equivalent of a telephone connection made by a wrongly dialed telephone number.

This type of situation is avoided by the present invention discussed next.

This Invention

Figure 1:
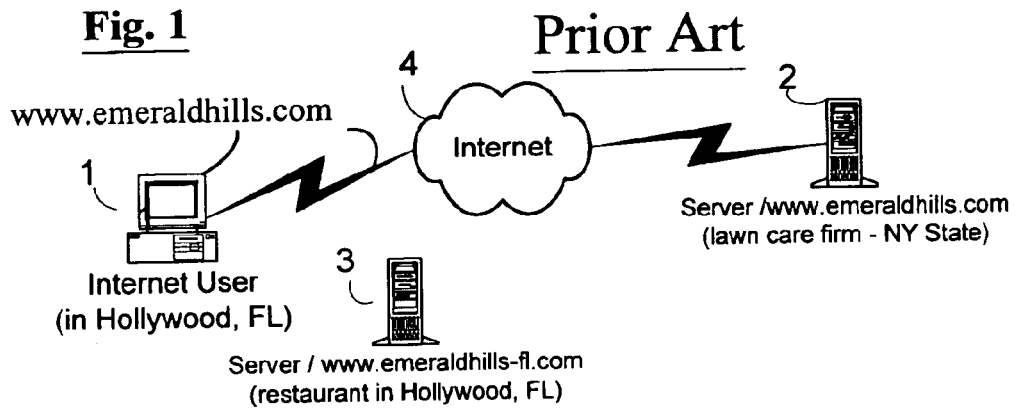
FIG. 1 is a schematic diagram illustrating "prior art" address location in the Internet as it is presently organized.
Figure 2:
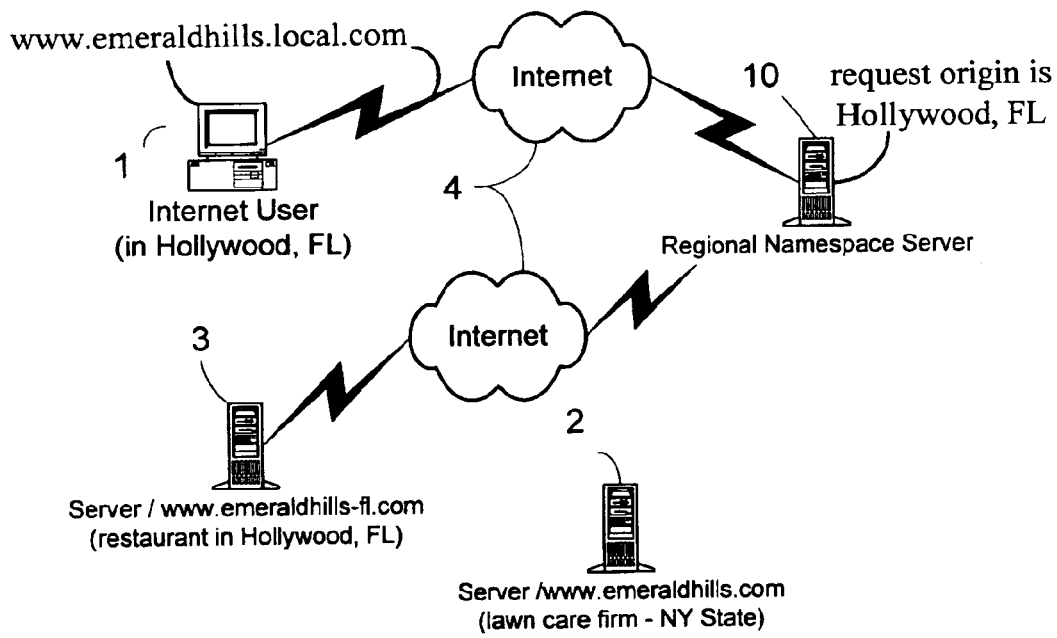
FIG. 2 is a schematic diagram illustrating Internet redirection conforming to the present invention.

The schematic of FIG. 2 is used to explain how a preferred embodiment of this invention operates. In this figure, it is assumed that the user of FIG. 1 is subscribed to a redirection service 10 using the domain name "*.local.com", where * represents a "wild card"; i.e. an arbitrary term, which need not be uniquely registered to anyone, but which can be interpreted by the service 10 for redirecting a request containing that term in a unique manner to a destination intended by the subscriber originating that request. Thus, a request from the user at 1 to "www.emeraldhills.local.com" is connected through the Internet 4 to the service 10. Service 10 determines, relative to this particular request, that: (a) the request is from a subscriber to the service; (b) a number of enterprises use the "generic" term "emeraldhills"; and (c) the closest enterprise using that term is that to which the domain name "www.emeraldhills-fl" is registered. With these determinations, the service redirects the request, with an appropriately altered domain name (i.e. "www.emeraldhills-fl"), to the closest enterprise 3, which is the destination the user intended to reach.

The block diagram in FIG. 3 is used to explain, on a broad level, the logical organization of a regional redirection server of the type shown at 10 in FIG. 2. As indicated in this figure, the server performs two basic processes: an initial process 12 to determine if the request is eligible for redirection processing, and a subsequent process 14 for selecting a redirection destination for eligible requests.

Figure 5:
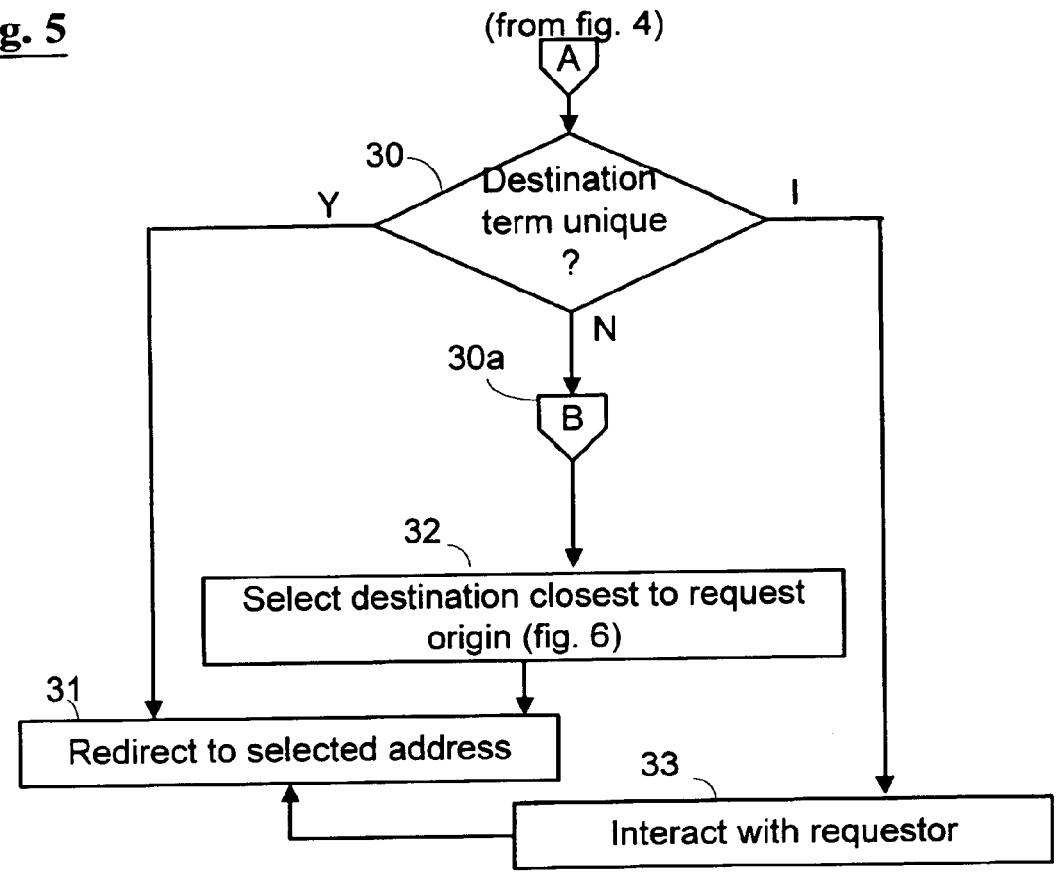
FIG. 5 is a flowchart characterizing processes performed by the service for determining if a received request is subject to redirection by the service.
Figure 6:
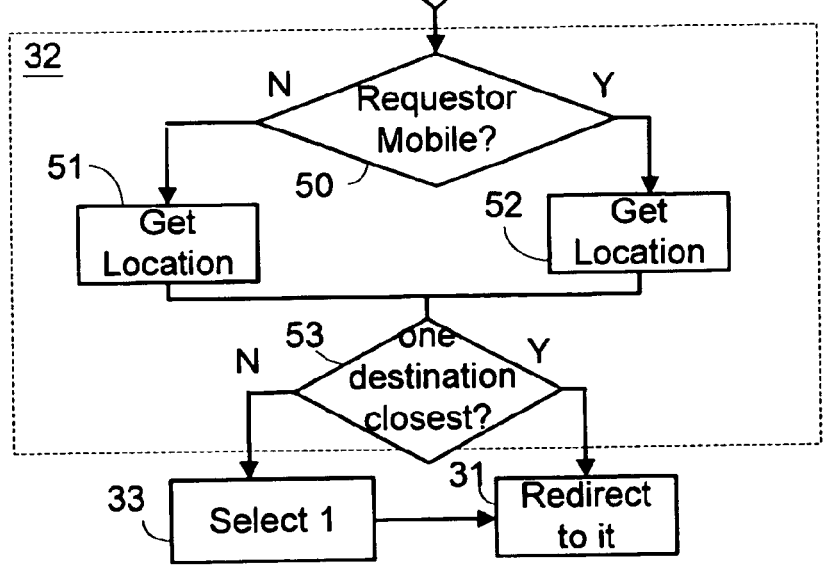
FIG. 6 is a flowchart showing details of processes for selecting a destination closest to a request originating user's location, when the request has potential association to plural destinations; that general function being shown as a single block in FIG. 5.

Flowcharts of FIGS. 4–6 are used to explain specifics of logical processes performed by the service 10 in effecting the foregoing request redirection. A

Details—Redirection Server Operation

Details of logical processes performed by the redirection server of FIG. 3 are described next with reference to flowcharts in FIGS. 4–6.

FIG. 4 characterizes processes performed by the server for determining if a received request is eligible for redirection handling. FIG. 5 characterizes server processes applicable to eligible requests, and FIG. 6 shows details of processes applicable to selection of a redirection destination for an eligible request having plural potentially associated destinations, that general function being shown as a single functional block in FIG. 5.

Referring to FIG. 4, upon detection of an incoming request (block 16), the server determines (decision 17) if the request is directed to it; i.e. if the request is one directed to "*.local.com". If the request is directed to this server it is determined if the request originated from a registered subscriber to the service associated with this server (decision 18). A request that is either not directed to this server or originated from other than a registered subscriber is rejected (operation 19). A request found to be eligible (directed to this server from a registered subscriber) is processed for redirection handling in accordance with FIG. 5, as suggested by the linking symbol 20.

Determination if a request is from a registered subscriber can be effected in several ways not considered directly relevant to this invention: (a) it could, for instance, be based upon data accompanying the request (e.g. a unique identity/password function assigned to the subscriber); (b) or it could be determined by linking to the request originator's browser and examining a cookie pre-inserted into the requestor's storage during creation of the subscription; (c) or it could be determined by linking to the request originator's browser and inter-acting directly with the requestor.

The process for selecting a unique redirection destination for an eligible request is shown in FIG. 5. Referring to this figure, the server determines (decision 30 if the "destination associated term" in the request (in the example of FIG. 2, if the term "emeraldhills") has a unique association with a single destination. For this purpose, the server examines a database of "destination associated terms" and potential destinations associated with each term. From this examination, the server would determine that the destination associated term is associated with either a single potential destination (Y result at decision 30), more than one potential destination (N result at decision 30), or no potential destination (result I, for "indeterminate", in decision 30). In the example of FIG. 2, the server would find of course that the term "emeraldhills" in the request is potentially associated with more than one destination.

If the request is associated with only a single potential destination, it is redirected to that destination (operation 31). If the request is associated with plural potential destinations, the server selects a destination closest to the request origin (operations 32), using the process shown in FIG. 6, and applies process 31 to redirect the request to the selected destination. If the request has no apparent association with a potential destination known to the server, operations 33 are performed to interact with the requestor and potentially guide the latter to indicate an intended destination.

When a destination-associated term in a request is potentially associated with more than one destination, the server selects (FIG. 6) if it can a destination closest to the subscriber and redirects the request to that destination. This selection may be based upon the server's knowledge of the location of a subscriber that has indicated that all requests will come from a single fixed location or postal zip code zone. It also may be based upon more sophisticated functions of geographic location relative to mobile subscribers. The server's knowledge of the subscriber's location may be based upon subscriber profile data obtained when the subscription is initiated. Such data may be stored at the server. Alternatively, all or part of such data can be stored at the subscriber's computer(s); e.g. in the form of a "cookie" transferred from the server to storage at the subscriber's site.

Result I in decision 30 may be invoked explicitly by the subscriber's request; e.g. by a request to "www.?.local.com", where the "?" represents an indication, pre-arranged between the service and its subscribers, that the subscriber does not know of an appropriate destination associated term. For example, if a subscriber is seeking to contact a restaurant with a business name not having any association to its domain name, the subscriber could send "?", receive back a screen asking the subscriber to select a type of business or other activity most closely associated with the subscriber's intended object, and the server could use a comprehensive second database to show the subscriber a list of one or more enterprises that are local to the subscriber (e.g. in or very near the subscriber's postal zip code zone). The subscriber could then indicate a positive selection of one item from the list.

Selection of Closest Destination

Details of the processes for selection of a destination closest to the requestor are explained with reference to FIG. 6. Logical functions encompassed by block 32 of FIG. 5 are indicated in dotted outline in FIG. 6.

Since the invention contemplates that a subscriber can be communicating from either a stationary or mobile location, the server determines at 50 which type of communication facility the requestor is using. If it is stationary, the server performs process 51 to get its location, and if it is mobile the server executes process 52. Processes 51 and 52, which may be quite different, are described below. Upon acquiring the requestor's location, the server acts at 53 to determine if, among the plural destinations potentially associated with the request, there is precisely one destination that is closest to the requestor's location. If there is such, the request is redirected to that location (operation 31). If more than one potential destination is in the neighborhood of the requestor, the server interacts with the requestor (via the latter's browser) to select one of these as the redirection target (operation 33) and redirects the request to that one (operation 31).

Location of a stationary requestor facility (process 51) can be accomplished by the server in any of several ways: (a) by looking up a zip code or address furnished by the requestor when the subscription was initiated; (b) by communicating with the requestor's browser and examining a "cookie" implanted into the requestor's storage during registration of the subscription; or (c) by communicating with the requestor per se and having the latter key in appropriate address or zip code data.

Location of a mobile requestor (process 52) also can be accomplished by the server in any of several ways: (a) by obtaining coordinates of the requestor's immediate location from a wireless communication carrier instantly operating between the requestor and the server; (b) by obtaining coordinates from satellite linked communication equipment operated by the requestor; or (c) by communicating directly with the requestor and having the latter furnish appropriate locating information.

Additional Examples

In addition to examples of services and/or functions already mentioned, other examples of forms and uses for presently contemplated redirection services are:

Use of pre-arranged functional terms as wild cards, where each functional term is associated with a particular enterprise; e.g. use of "www.dining.local.com" to locate dining establishments near the request origin, to display a list of such for selection by the requestor, and to link the requestor to the web page of the selected establishment Use of numbers as modifiers to wild card terms to specify a proximity range; e.g. use of "www.dining-2.local.com" to specify location of dining establishments within 2 miles of the request origin Other applications and potential benefits of the invention should be readily apparent from the foregoing.

Other Relevant Considerations

Functions described above, in reference to FIGS. 4–6, can be realized either entirely in hardware or through a combination of hardware supervised by software. Software associated with such functions can be either permanently stored at a server responsible for redirection or obtained by the server from a source external to said server. Where used by servers that are computers, such software associated with such functions should be formed as computer programs. In the present context, computer programs are expressions in any computer language, code or notation of sets of instructions useful to cause respective computer systems to perform the functions presently contemplated. Such programs may be stored in a variety of storage media and delivered to respective computer systems through a variety of transmission media, including transmission media forming parts of a network.

Accordingly, we claim the following.

We claim:

1. A system for providing a domain name lookup and redirection services to multiple users of a data communication network who are subscribed to said service, said system comprising a server located at a unique and predetermined address in said network, said server comprising:

first means responsive to an inquiry received from one of said subscribed users, said inquiry effectively designating plural destinations in said network as potential targets for redirection of the respective inquiry, for operating in conformance to a predetermined set of criteria uniquely associated to said one subscribed user to determine an address in said network uniquely assigned to a single one of said plural destinations; said inquiry containing a first addressing term uniquely designating the location of said server in said network, and a second addressing term constituting a name having a non-unique association to all of said plural destinations; and second means activated by said first means for using said determined address to redirect said inquiry to only said single one of said plural destinations.

2. A system according to claim 1 wherein said first and second means utilize "user profile" information obtained from said one subscribed user to establish said predetermined set of criteria.

3. A system according to claim 2 wherein said user profile information is stored in a computer device operated by said one subscribed user.

4. A system according to claim 3 wherein said user profile information is stored in said computer device in the form of a "cookie" placed in said computer device by said server.

5. A system according to claim 3 wherein said user profile information is stored in said computer device in the form or a plug-in mini-application placed in said computer devices by said server.

6. A system according to claim 2 wherein said profile information is stored by said server in a location remote from the immediate location of said one subscribed user.

7. A system according to claim 2 wherein, in the event that information available to said server is insufficient to make a unique determination of a destination to which said inquiry should be redirected, said server communicates directly with said one subscribed user to indicate a plurality of specific destinations name options apparently meeting said predetermined criteria for connection; said indicated options being presented in a form enabling said one subscribed user to select one of said indicated options, enabling said server to redirect said inquiry to a destination associated with the selected option.

8. A system according to claim 2 wherein said predetermined set of criteria is associated with a small geographic region including said one subscribed user's immediate location, and said inquiry is required to be redirected to a destination within said region.

9. A system according to claim 8 wherein said one subscribed user may be mobile and said immediate location of said one subscribed user may thereby vary over time.

10. A system according to claim 8 wherein said one subscribed user is stationary so that said user's immediate location is fixed over time.

11. A method of providing a name-based redirection service to multiple users of a data communication network who are subscribed to said service, said method comprising:

receiving inquiries from said subscribed users at a server providing said service: each said inquiry containing a locator expression including a first term, for initially directing the respective inquiry to said server, and a second term useful for locating destinations in said network remote from said server; said second term being susceptible of association with more than one said remote destination;

in response to said second term in each said inquiry, selecting a network address uniquely associated with a single said remote destination; and redirecting the respective inquiry to the respectively selected network address.

12. The method according to claim 11 wherein each said step of selecting said uniquely associated network address includes:

referring to subscriber profile information registered in association with the user who originated the respective said inquiry, as a factor in making the respective selection.

13. The method according to claim 11 wherein each said step of selecting said uniquely associated network address, when the respective second term is associated with plural such addresses, includes steps of:

determining remoteness of the destinations associated with said addresses, relative to the instantaneous location of the source of the respective inquiry currently being processed; and selecting the network address of a destination closest to said instantaneous source location.

14. The method according to claim 12 wherein at least a portion of said subscriber profile information of a subscriber whose inquiry is currently being processed is stored in a computer currently being used by the respective subscriber, and wherein said step of determining a said single separate destination for an inquiry currently in the process of being redirected includes:

communicating with said currently used computer to refer to profile information stored in that computer.

15. The method according to claim 11 wherein, when a said second term in an inquiry currently being processed is found to be associated with plural destinations in said network and information currently available to said service is insufficient to form a basis for unambiguously selecting a single one of said destinations as a target for redirection of the respective inquiry, said step of selecting said network address associated with said single destination includes a step of communicating bidirectionally with the subscriber whose inquiry is currently being processed to resolve any ambiguities preventing said selection of said single destination.

16. For a computer-based service to redirect inquiries through a data communication network, wherein a server providing said service receives inquiries from subscribers to said service and redirects each received inquiry to a single destination in said network, and wherein an inquiry currently undergoing processing is potentially associated with plural destinations in said network, a software-based system for effecting redirection of said inquiry currently undergoing processing; to a single one of said plural destinations; said software-based system including:

means responsive to information contained in said current inquiry to ascertain destinations potentially associated with said inquiry; and means using predetermined selection criteria associated with the subscriber originating said current inquiry, for selecting a single one of said potential destinations, as the target for redirection of the respective inquiry.

17. A software-based system in accordance with claim 16 wherein said means using said predetermined selection criteria includes:

means for determining the instantaneous geographic location of the subscriber who originated said current inquiry;

means for determining relative distances between said potential destinations and said subscriber's location; and means for selecting a single one of said potential destinations that is closest to said subscriber's location as the target for redirection of said current inquiry.

* * * * *